US010476299B2

(12) United States Patent
Li et al.

(10) Patent No.: US 10,476,299 B2
(45) Date of Patent: Nov. 12, 2019

(54) DC LINK VOLTAGE CONTROL (71) Applicant: SCHNEIDER ELECTRIC IT CORPORATION, West Kingston, RI (US)

(72) Inventors: Bo Li, Shanghai (CN); Wei-Shih Chiang, Shanghai (CN); Damir Klikic, Waltham, MA (US); Zhiqiang Jiang, Shanghai (CN)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 151 days.

(21) Appl. No.: 15/307,120

(22) PCT Filed: May 2, 2014

(86) PCT No.: PCT/CN2014/076696
§ 371 (c)(1),
(2) Date: Oct. 27, 2016

(87) PCT Pub. No.: WO2015/165121
PCT Pub. Date: Nov. 5, 2015

(65) Prior Publication Data
US 2017/0047773 A1    Feb. 16, 2017

(51) Int. Cl.
*H02J 9/00*    (2006.01)
*H02J 9/06*    (2006.01)
(Continued)

(52) U.S. Cl.
CPC ............... *H02J 9/062* (2013.01); *H02J 5/00* (2013.01); *H02J 7/02* (2013.01); *H02M 1/4208* (2013.01)

(58) Field of Classification Search
CPC .... H02J 9/062; H02J 5/00; H02J 7/02; H02M 1/4208
(Continued)

(56) References Cited

U.S. PATENT DOCUMENTS

| 5,289,046 A | * | 2/1994 | Gregorich ............... H02J 9/062 307/64 |
| 6,169,669 B1 | * | 1/2001 | Choudhury ............. H02J 9/062 307/66 |

(Continued)

FOREIGN PATENT DOCUMENTS

| CN | 101043145 A | 9/2007 |
| CN | 101375490 A | 2/2009 |

(Continued)

OTHER PUBLICATIONS

Extended European Search Report from corresponding European Application No. 14891061.5 dated Nov. 10, 2017.
(Continued)

*Primary Examiner* — Richard Tan
(74) *Attorney, Agent, or Firm* — Lando & Anastasi, LLP (57) ABSTRACT

An Uninterruptible Power Supply (UPS) system is provided. The UPS system comprises: an input (102) configured to receive input power having an input voltage level, an output (110) configured to provide output AC power to a load, a converter (104) coupled to the input (102) and configured to convert the input power into DC power having a DC voltage level, a DC bus (106) coupled to the converter (104) and configured to receive the DC power, an inverter (108) coupled to the DC bus (106) and configured to convert the DC power from the DC bus (106) into the output AC power and provide the output AC Power to the output (110), and a controller (114) configured to monitor the input voltage level, monitor a level of the output AC power, and operate (Continued)

the converter (104) to regulate the DC voltage level based on the input voltage level and the output AC power level.

14 Claims, 3 Drawing Sheets

(51) Int. Cl.
*H02J 7/02* (2016.01)
*H02J 5/00* (2016.01)
*H02M 1/42* (2007.01)

(58) Field of Classification Search
USPC .......................................................... 307/64
See application file for complete search history.

(56) References Cited

U.S. PATENT DOCUMENTS

| | | | | |
|---|---|---|---|---|
| 7,615,891 | B2* | 11/2009 | Wu | H02J 9/062 |
| | | | | 307/66 |
| 7,671,487 | B2* | 3/2010 | Wang | H02J 9/062 |
| | | | | 307/64 |
| 2001/0001535 | A1* | 5/2001 | Johnson, Jr. | H02J 9/061 |
| | | | | 323/282 |
| 2003/0048006 | A1* | 3/2003 | Shelter, Jr. | H02J 9/061 |
| | | | | 307/64 |
| 2003/0053324 | A1 | 3/2003 | Yamamoto et al. | |
| 2007/0063668 | A1 | 3/2007 | Schnetzka et al. | |
| 2007/0216228 | A1 | 9/2007 | Johnson et al. | |
| 2009/0160254 | A1 | 6/2009 | Wu et al. | |
| 2010/0067269 | A1 | 3/2010 | Heber et al. | |
| 2012/0019070 | A1 | 1/2012 | Matsuoka et al. | |
| 2012/0176088 | A1 | 7/2012 | Lee | |
| 2014/0021789 | A1* | 1/2014 | Greer | H02J 9/06 |
| | | | | 307/64 |
| 2015/0076916 | A1 | 3/2015 | Cheng et al. | |

FOREIGN PATENT DOCUMENTS

| | | |
|---|---|---|
| CN | 101926070 A | 12/2010 |
| CN | 102449876 A | 5/2012 |
| CN | 102593956 A | 7/2012 |
| CN | 103337901 A | 10/2013 |
| GB | 2503025 A | 12/2013 |

OTHER PUBLICATIONS

Notification of Transmittal of the International Search Report and the Written Opinion of the International Searching Authority from corresponding PCT/CN2014/076696 dated Feb. 4, 2015.

* cited by examiner

FIG. 3

DC LINK VOLTAGE CONTROL

CROSS-REFERENCE TO RELATED APPLICATIONS

This application is a U.S. National Stage Application under 35 U.S.C. § 371 of International Application No. PCT/CN2014/076696, filed May 2, 2014, titled DC LINK VOLTAGE CONTROL, which is hereby incorporated herein by reference in its entirety.

BACKGROUND OF INVENTION

1. Field of Invention

The present invention relates generally to systems and methods for controlling an uninterruptible power supply (UPS).

2. Discussion of Related Art

The use of power devices, such as uninterruptible power supplies (UPS), to provide regulated, uninterrupted power for sensitive and/or critical loads, such as computer systems and other data processing systems, is known. Known uninterruptible power supplies include on-line UPS's, off-line UPS's, line interactive UPS's as well as others. On-line UPS's provide conditioned AC power as well as back-up AC power upon interruption of a primary source of AC power. Off-line UPS's typically do not provide conditioning of input AC power, but do provide back-up AC power upon interruption of the primary AC power source. Line interactive UPS's are similar to off-line UPS's in that they switch to battery power when a blackout occurs.

SUMMARY OF INVENTION

At least one aspect of the invention is directed to an Uninterruptible Power Supply (UPS) system, the UPS system comprising an input configured to receive input power having an input voltage level, an output configured to provide output AC power to a load, a converter coupled to the input and configured to convert the input power into DC power having a DC voltage level, a DC bus coupled to the converter and configured to receive the DC power, an inverter coupled to the DC bus and configured to convert the DC power from the DC bus into the output AC power and provide the output AC Power to the output, and a controller configured to monitor the input voltage level, monitor a level of the output AC power, and operate the converter to regulate the DC voltage level based on the input voltage level and the output AC power level.

According to one embodiment, the controller is further configured to adjust the DC voltage level based on the input voltage level and the output AC power level. In another embodiment, the controller is further configured to determine whether the input voltage level is less than an input voltage threshold level. In one embodiment, in response to determining that the input voltage is greater than the input voltage threshold level, the controller is further configured to regulate the DC voltage level to a maximum DC voltage level.

According to another embodiment, the controller is further configured to determine whether the output AC power level is less than an output power threshold level. In one embodiment, in response to determining that the input voltage level is less than the input voltage threshold level and the output AC power level is less than the output power threshold level, the controller is further configured to decrease the DC voltage level. In another embodiment, in response to determining that the output AC power level is less than the output power threshold level by a first amount, the controller is further configured to decrease the DC voltage level to a first reduced level. In another embodiment, in response to determining that the output AC power level is less than the output power threshold level by a second amount greater than the first amount, the controller is further configured to decrease the DC voltage level to a second reduced level.

According to one embodiment, in response to determining that the output AC power level is greater than the output power threshold level, the controller is further configured to regulate the DC voltage level to a maximum DC voltage level. In one embodiment, the input is further configured to receive input AC power and the converter is further configured to convert the input AC power into the DC power. In another embodiment, in monitoring the input voltage level the controller is further configured to determine an RMS voltage of the input power.

Another aspect of the invention is directed to a method for operating a UPS system, the method comprising receiving, at an input of the UPS system, input power having an input voltage level, converting the input power into DC power having a DC voltage level, providing the DC power to a DC bus, converting the DC power into output AC power, providing the output AC power to an output of the UPS system, and regulating the DC voltage level based on the input voltage level and a level of the output AC power.

According to one embodiment, regulating comprises monitoring the input voltage level, monitoring the output AC power level, and adjusting the DC voltage level based on the input voltage level and the output AC power level. In one embodiment, monitoring the input voltage level comprises determining whether the input voltage level is less than an input voltage threshold level. In another embodiment, adjusting the DC voltage level comprises, in response to determining that the input voltage is greater than the input voltage threshold level, regulating the DC voltage level to a maximum DC voltage level.

According to another embodiment, monitoring the output AC power level comprises determining whether the output AC power level is less than an output power threshold level. In one embodiment, adjusting the DC voltage level comprises, in response to determining that the input voltage level is less than the input voltage threshold level and the output AC power level is less than the output power threshold level, decreasing the DC voltage level. In another embodiment, decreasing the DC voltage level comprises in response to determining that the output AC power level is less than the output power threshold level by a first amount, decreasing the DC voltage level to a first reduced level, and in response to determining that the output AC power level is less than the output power threshold level by a second amount greater than the first amount, decreasing the DC voltage level to a second reduced level.

According to one embodiment, adjusting the DC voltage level comprises, in response to determining that the output AC power level is greater than the output power threshold level, regulating the DC voltage level to a maximum DC voltage level.

One aspect of the invention is directed to an Uninterruptible Power Supply (UPS) system, the UPS system comprising an input configured to receive input power having an input voltage level, an output configured to provide output AC power to a load, a converter coupled to the input and configured to convert the input power into DC power having a DC voltage level, a DC bus coupled to the converter and configured to receive the DC power, an inverter coupled to the DC bus and configured to convert the DC power from the DC bus into output AC power and provide the output AC power to the output, and means for regulating the DC voltage level based on the input voltage level and a level of the output AC power to increase efficiency of the UPS system.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, power devices, such as uninterruptible power supplies (UPS) are oftentimes used to provide regulated, uninterrupted power to sensitive and/or critical loads. An online UPS typically includes a front end AC/DC PFC converter, a DC/AC inverter, and a DC bus coupled between the converter and the inverter. The front end AC/DC PFC converter receives input AC power from a power source, converts the input AC power into DC power and provides the DC power to the DC bus. The DC bus provides the DC power to the DC/AC inverter, the DC/AC inverter converts the DC power into regulated AC power, and the regulated AC power is provided to a load coupled to the output of the UPS.

The voltage of the DC bus is generally regulated, by the AC/DC PFC converter, to a fixed value (e.g., 380V or higher) regardless of the load currently being powered by the UPS. The AC/DC converter typically requires the voltage level of the DC bus to be higher than the AC/DC converter's maximum input peak value. As such, the voltage level of the DC bus is commonly regulated to a fixed level higher than, or equal to, the maximum input peak value of the AC/DC converter.

Maintaining the voltage level of the DC bus at a fixed level regardless of the load currently being powered by the UPS may result in the UPS having an unnecessarily low efficiency level. For example, the switching losses of the AC/DC converter and the DC/AC inverter are proportional to the DC bus voltage. The higher the DC bus voltage, the lower the total efficiency of the UPS. If power provided by the UPS to the load is reduced, but the voltage level of the DC bus is maintained at a fixed level (which is beyond a level required to provide the reduced power to the load), the efficiency of the UPS will be unnecessarily maintained at, or below, the low level related to the fixed DC bus voltage, despite the reduction in load power.

Accordingly, a system and method is provided that monitors the input voltage and the load of a UPS and regulates the DC bus voltage level based on the input voltage and the load of the UPS. In some embodiments, the DC bus voltage is regulated to a lower value if the input voltage and the load are lower than predetermined threshold values. By lowering the DC bus voltage level when the input voltage and the load are lower than predetermined threshold values, the efficiency of the UPS may be increased while providing the required reduced power to the load.

Figure 1:
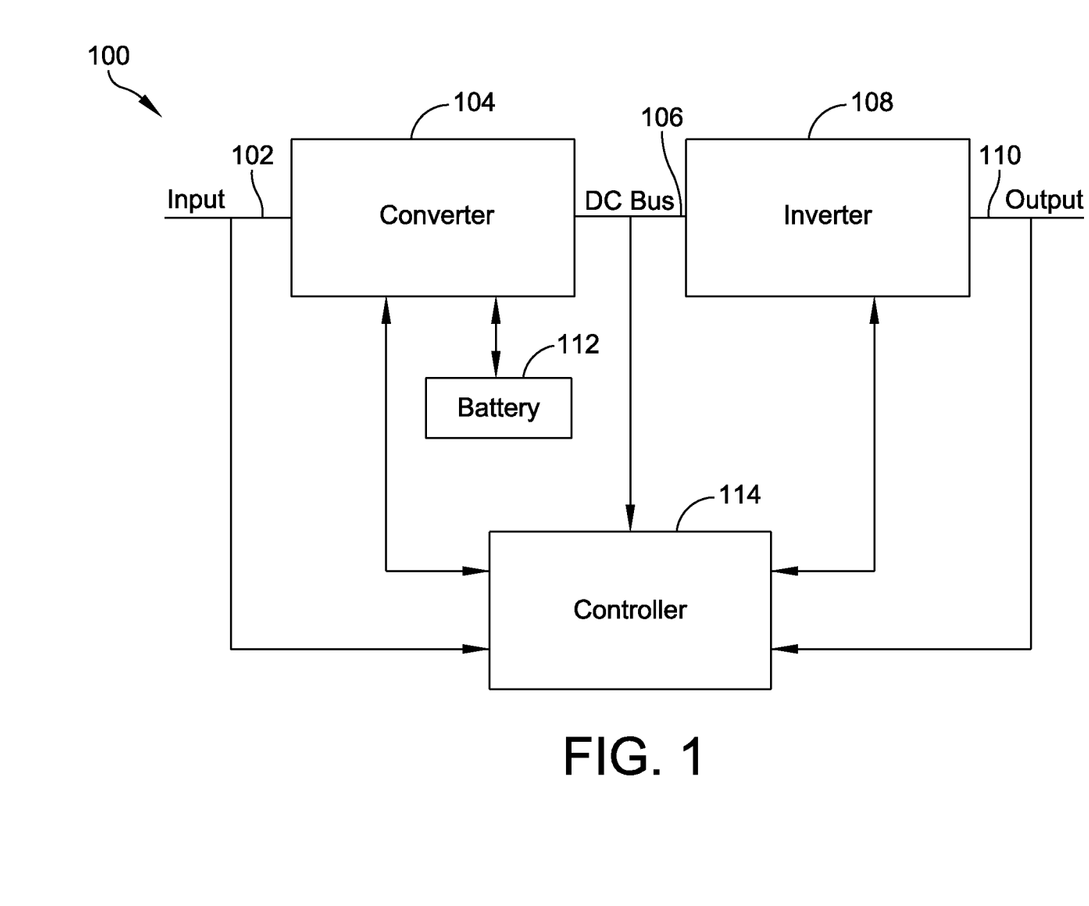
FIG. 1 is a block diagram of a UPS system according to aspects of the current invention.

FIG. 1 is a block diagram of an online UPS 100 according to one aspect of the present invention. The UPS 100 includes an input 102, a converter 104, a DC bus 106, an inverter 108, an output 110, a battery 112, and a controller 114. The input 102 is coupled to the converter 104. The DC bus 106 is coupled between the converter 104 and the inverter 108. The output 110 is coupled to the inverter 108. The controller 114 is coupled to the input 102, the output 110, the converter 104, the DC bus 106, and the inverter 108. The battery is coupled to the converter 104.

The input 102 is configured to be coupled to an AC mains power source and to receive input AC power having an input voltage level. The UPS 100 is configured to operate in different modes of operation based on the status of the AC power provided to the input 102. When AC power provided to the input 102 is acceptable (i.e., above an input power threshold), the UPS 100 operates in a normal mode of operation. In the normal mode of operation, AC power from the input 102 is provided to the converter 104. According to one embodiment, the converter 104 is a Power Factor Correction converter 104; however, in other embodiments, other types of converters may be utilized. The converter 104 converts the AC power into DC power and provides the DC power to the DC bus 106. In one embodiment, DC power is also provided from the converter 104 to the battery to charge the battery 112. In the normal mode of operation, the inverter 108 receives DC power from the DC bus 106, converts the DC power into regulated AC power, and provides regulated AC power to a load coupled to the output 110.

When AC power provided to the input 102 is not acceptable (i.e., below an input power threshold), the UPS 100 operates in a backup mode of operation. In the backup mode of operation, DC power from the battery 112 is regulated by the converter 104 and provided to the DC bus 106. The inverter 108 receives the DC power from the DC bus 106, converts the DC power into regulated AC power, and provides the regulated AC power to the output 110.

In the normal mode of operation, the controller 114 monitors the input voltage level at the input 102 and the output power provided to the load via the output 110. Based on the input voltage and the output power, the controller 114 operates the converter 104 to regulate the voltage level of the DC bus 106. If the controller 114 determines that the input voltage and the output power are less than predetermined threshold values, the controller 114 operates the converter 114 to reduce the voltage level of the DC bus 106, thereby increasing the efficiency of the UPS 100 while still providing the required power to the load.

In at least one embodiment, the controller 114 monitors the input AC voltage to ensure that the peak input voltage of the UPS 100 does not exceed the DC voltage level of the DC bus 106. If the peak input voltage exceeds the DC voltage level of the DC bus 106, the converter 104 may be bypassed resulting in an undesired input inrush current to the UPS 100. The controller 114 also monitors the output power provided to the load via the output 110 to determine if it is acceptable to reduce the voltage level of the DC bus 106 while still providing the required output power. Operation of the controller 114 is discussed in greater detail below.

Figure 2:
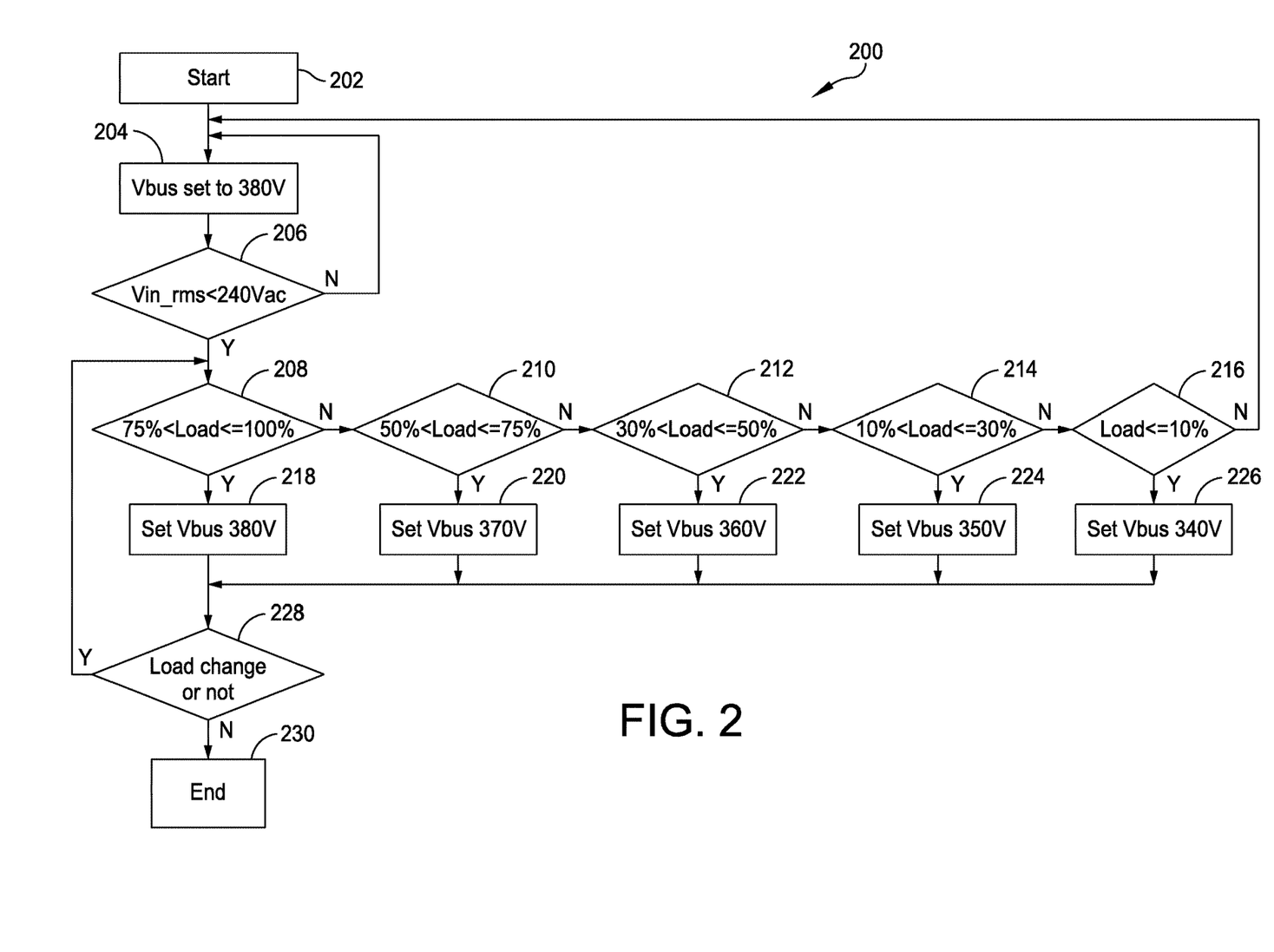
FIG. 2 is a flow chart illustrating a process for operating a UPS system according to one aspect of the present invention.

FIG. 2 is a flow chart illustrating a process 200 for operating the UPS system 100 according to one aspect of the present invention. At block 202, the converter 104 receives AC input power (including input AC voltage) from an AC source via the input 102. The converter 104 converts the AC power into DC power and provides the DC power to the DC bus 106. The DC power is provided to the inverter 108 and the inverter 108 converts the DC power into AC output power. The AC output power is provided to a load coupled to the output 110.

At block 204, the controller 114 operates the converter 104 to regulate the DC voltage level of the DC bus 106 to a maximum DC bus voltage level. In one embodiment, the maximum DC bus voltage level is 380V; however, in other embodiments, the maximum DC bus voltage level may be defined differently.

At block 206, the controller 114 monitors the input AC voltage and measures the input RMS (Root Mean Square) voltage at the input 102. The controller 114 determines whether the input RMS voltage is less than a predetermined input voltage threshold level. In one embodiment, the input voltage threshold level is 240 VAC; however, in other embodiments, the input voltage threshold level may be defined differently. In response to a determination that the input RMS voltage is greater than the predetermined input voltage threshold level (e.g., 240 VAC), the controller 114 operates the converter 104 to regulate the DC voltage level of the DC bus 106 to the maximum DC bus voltage level (e.g., 380V).

At block 208, in response to a determination that the input RMS voltage is less than the predetermined input voltage threshold level (e.g., 240 VAC), the controller 114 monitors the output power provided to the load coupled to the output 110 and determines if the output power is at a level between 75 and 100 percent of a maximum output power level. At block 218, in response to a determination that the output power is at a level between 75 and 100 percent of the maximum output power level, the controller 114 operates the converter 104 to regulate the DC voltage level of the DC bus 106 to the maximum DC bus voltage level (e.g., 380V).

At block 210, in response to a determination that the output power is not at a level between 75 and 100 percent of the maximum output power level, the controller 114 determines if the output power provided to the load coupled to the output 110 is at a level between 50 and 75 percent of the maximum output power level. At block 220, in response to a determination that the output power is at a level between 50 and 75 percent of the maximum output power level, the controller 114 operates the converter 104 to regulate the DC voltage level of the DC bus 106 to a first reduced DC bus voltage level. In one embodiment, the first reduced DC bus voltage level is 370V; however, in other embodiments, the first reduced DC bus voltage level may be defined differently.

At block 212, in response to a determination that the output power is not at a level between 50 and 75 percent of the maximum output power level, the controller 114 determines if the output power provided to the load coupled to the output 110 is at a level between 30 and 50 percent of the maximum output power level. At block 222, in response to a determination that the output power is at a level between 30 and 50 percent of the maximum output power level, the controller 114 operates the converter 104 to regulate the DC voltage level of the DC bus 106 to a second reduced DC bus voltage level. In one embodiment, the second reduced DC bus voltage level is 360V; however, in other embodiments, the second reduced DC bus voltage level may be defined differently.

At block 214, in response to a determination that the output power is not at a level between 30 and 50 percent of the maximum output power level, the controller 114 determines if the output power provided to the load coupled to the output 110 is at a level between 10 and 30 percent of the maximum output power level. At block 224, in response to a determination that the output power is at a level between 10 and 30 percent of the maximum output power level, the controller 114 operates the converter 104 to regulate the DC voltage level of the DC bus 106 to a third reduced DC bus voltage level. In one embodiment, the third reduced DC bus voltage level is 350V; however, in other embodiments, the third reduced DC bus voltage level may be defined differently.

At block 216, in response to a determination that the output power is not at a level between 10 and 30 percent of the maximum output power level, the controller 114 determines if the output power provided to the load coupled to the output 110 is at a level less than or equal to 10 percent of the maximum output power level. At block 226, in response to a determination that the output power is at a level less than or equal to 10 percent of the maximum output power level, the controller 114 operates the converter 104 to regulate the DC voltage level of the DC bus 106 to a fourth reduced DC bus voltage level. In one embodiment, the fourth reduced DC bus voltage level is 340V; however, in other embodiments, the fourth reduced DC bus voltage level may be defined differently.

At block 204, in response to a determination that the output power is not at a level less than or equal to 10 percent of the maximum output power, the controller 114 operates the converter 104 to regulate the DC voltage level of the DC bus 106 to the maximum DC bus voltage level (e.g., 380V).

At block 228, after the DC voltage level of the DC bus 106 has been regulated to a desired level based on the output power of the UPS 100 (e.g., at blocks 218-226), the controller determines if the output power of the UPS 100 has changed. In response to a determination that the output power of the UPS 100 has changed, the controller again determines how much the output power has changed (e.g., at blocks 208-216) and adjusts (i.e., either increases or decreases) the DC voltage level of the DC bus 100 accordingly (e.g., at blocks 218-226). At block 230, in response to a determination that the output power of the UPS 100 has not changed, controller 114 continues to operate the converter 104 to regulate the DC voltage level of the DC bus 106 to the desired level.

According to one embodiment, the controller 114 also determines if the load coupled to the UPS is too unstable to adjust the DC bus voltage level. For example, in one embodiment, the controller 114 monitors the number of times the output power provided by the UPS 100 to the load changes in a set period of time. If the controller 114 determines that the output power of the UPS 100 has changed more than a threshold number of times, the controller 114 prevents adjustment of the DC bus voltage level until the output power of the UPS 100 stabilizes.

By adjusting the DC voltage level of the DC bus 100 based on the input RMS voltage and the output power of the UPS 100, the efficiency of the UPS 100 may be increased. For example, if the input RMS voltage and the output power of the UPS 100 are both below predetermined threshold levels, the DC voltage level of the DC bus 100 may be reduced to a level sufficient to provide the required reduced output power, but at which the efficiency of the UPS 100 is also increased.

Figure 3:
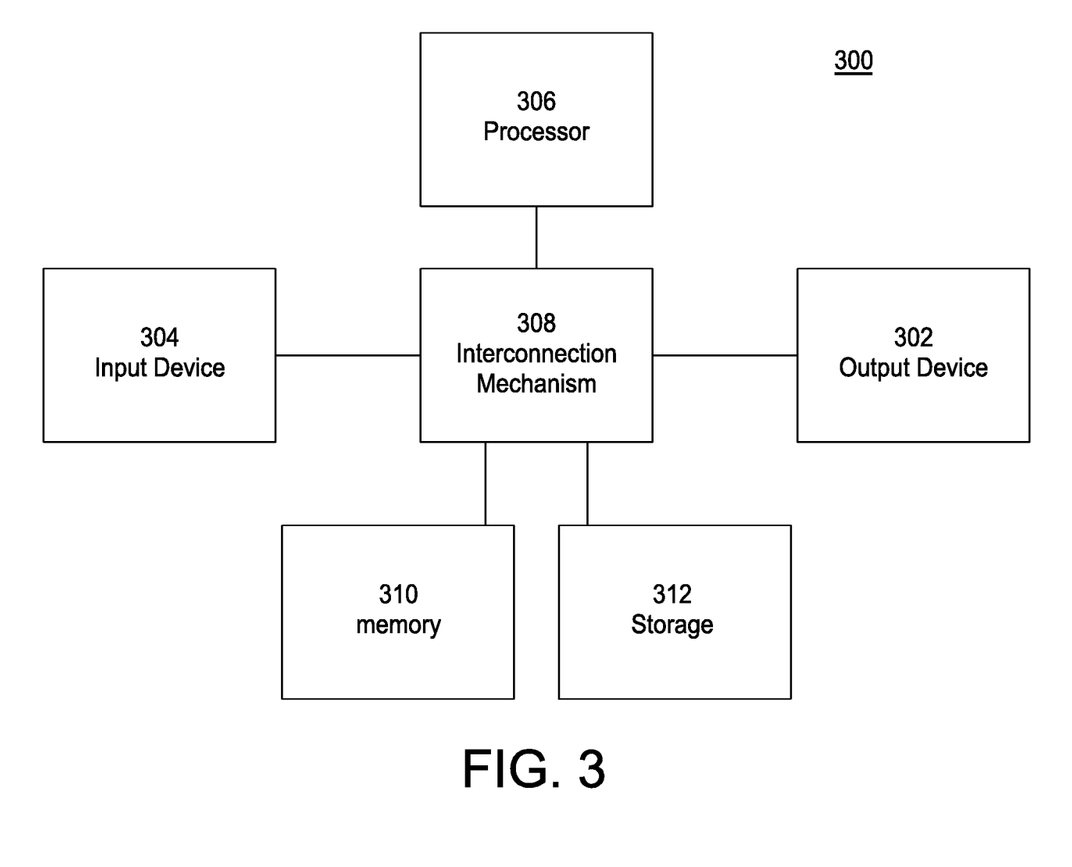
FIG. 3 is a block diagram of a system upon which various embodiments of the invention may be implemented.

FIG. 3 illustrates an example block diagram of computing components forming a system 300 which may be configured to implement one or more aspects disclosed herein. For example, the system 300 may be communicatively coupled to or included within the UPS 100.

The system 300 may include for example a general-purpose computing platform such as those based on Intel PENTIUM-type processor, Motorola PowerPC, Sun Ultra-SPARC, Texas Instruments-DSP, Hewlett-Packard PA-RISC processors, or any other type of processor. System 300 may include specially-programmed, special-purpose hardware, for example, an application-specific integrated circuit (ASIC). Various aspects of the present disclosure may be implemented as specialized software executing on the system 300 such as that shown in FIG. 3.

The system 300 may include a processor/ASIC 306 connected to one or more memory devices 310, such as a disk drive, memory, flash memory or other device for storing data. Memory 310 may be used for storing programs and data during operation of the system 300. Components of the computer system 300 may be coupled by an interconnection mechanism 308, which may include one or more buses (e.g., between components that are integrated within a same machine) and/or a network (e.g., between components that reside on separate machines). The interconnection mechanism 308 enables communications (e.g., data, instructions) to be exchanged between components of the system 300.

The system 300 also includes one or more input devices 304, which may include for example, a keyboard or a touch screen. The system 300 includes one or more output devices 302, which may include for example a display. In addition, the computer system 300 may contain one or more interfaces (not shown) that may connect the computer system 300 to a communication network, in addition or as an alternative to the interconnection mechanism 308.

The system 300 may include a storage system 312, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 310 that allows for faster access to the information by the processor/ASIC than does the medium. This memory 310 may be a volatile, random access memory such as a dynamic random access memory (DRAM) or static memory (SRAM). It may be located in storage system 312 or in memory system 310. The processor 306 may manipulate the data within the integrated circuit memory 310 and then copy the data to the storage 312 after processing is completed. A variety of mechanisms are known for managing data movement between storage 312 and the integrated circuit memory element 310, and the disclosure is not limited thereto. The disclosure is not limited to a particular memory system 310 or a storage system 312.

The system 300 may include a general-purpose computer platform that is programmable using a high-level computer programming language. The system 300 may be also implemented using specially programmed, special purpose hardware, e.g. an ASIC. The system 300 may include a processor 306, which may be a commercially available processor such as the well-known Pentium class processor available from the Intel Corporation. Many other processors are available. The processor 306 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

As described above, the UPS 100 receives AC power at the input 102 from an AC source; however, in other embodiments, the UPS 100 may receive DC input power from a DC source and the controller 114 may operate the converter 104 to regulate the DC input power to a desired DC bus voltage level based on the DC input power and the output power of the UPS 100.

As also described above, the controller 114 monitors the input AC voltage of the UPS 100 and does not allow adjustment of the DC voltage level of the DC bus 106 if the input AC voltage is below an input voltage threshold level. However, in other embodiments, the controller 114 may only monitor the output power of the UPS 100 and adjust the DC voltage level of the DC bus 106 based on the output power.

As described above, the DC bus voltage level is adjusted in the online mode of operation of the UPS 100; however, in other embodiments, the DC bus voltage level is also adjusted, based on the input voltage and the output power of the UPS 100, in the battery mode of operation. In the battery mode of operation, the controller 114 may operate the converter 104 to regulate backup DC power (from the battery 112) to a desired DC bus voltage level based on the backup DC power provided by the battery 112 and the output power of the UPS 100.

As described above, the UPS 100 is an online UPS; however, in other embodiments, the UPS 100 is a different type of UPS (e.g., an offline UPS or a line-interactive UPS).

As described above, the DC bus voltage level is regulated between 340V and 380V; however, in other embodiments, the range of DC bus voltage levels may be configured differently. As also described above, the controller determines whether the output power of the UPS falls within any one of five different ranges; however, in other embodiments, the controller may determine whether the output power of the UPS falls within any number of different ranges, the ranges being defined in any appropriate configuration.

At least some embodiments described herein provide a system and method for monitoring the input voltage and the load of a UPS and regulating the DC bus voltage level based on the input voltage and the load of the UPS. In some embodiments, the DC bus voltage is regulated to an optimal minimum value if the input voltage and the load are lower than predetermined threshold values. By lowering the DC bus voltage level to the optimal minimum value when the input voltage and the load are lower than predetermined reference values, the efficiency of the UPS may be increased while providing the reduced power to the load. For example, in some embodiments, the efficiency of the UPS may be increased by 2-4% depending on the load.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An Uninterruptible Power Supply (UPS) system, the UPS system comprising:
an input configured to receive input power having an input voltage level;
an output configured to provide output AC power to a load;
a converter coupled to the input and configured to convert the input power into DC power having a DC voltage level;
a DC bus coupled to the converter and configured to receive the DC power;
an inverter coupled to the DC bus and configured to convert the DC power from the DC bus into the output AC power and provide the output AC power to the output; and
a controller configured to monitor the input voltage level, monitor a level of the output AC power, and operate the converter to adjust the DC voltage level based on the input voltage level and the output AC power level, wherein the controller is further configured to determine whether the input voltage level is less than an input voltage threshold level and, in response to determining that the input voltage is greater than the input voltage threshold level, adjust the DC voltage level to a maximum DC voltage level.

2. The UPS system of claim 1, wherein the controller is further configured to determine whether the output AC power level is less than an output power threshold level.

3. The UPS system of claim 2, wherein in response to determining that the input voltage level is less than the input voltage threshold level and the output AC power level is less than the output power threshold level, the controller is further configured to decrease the DC voltage level.

4. The UPS system of claim 3, wherein in response to determining that the output AC power level is less than the output power threshold level by a first amount, the controller is further configured to decrease the DC voltage level to a first reduced level.

5. The UPS system of claim 4, wherein in response to determining that the output AC power level is less than the output power threshold level by a second amount greater than the first amount, the controller is further configured to decrease the DC voltage level to a second reduced level.

6. The UPS system of claim 2, wherein in response to determining that the output AC power level is greater than the output power threshold level, the controller is further configured to regulate the DC voltage level to a maximum DC voltage level.

7. The UPS system of claim 1, wherein the input is further configured to receive input AC power and the converter is further configured to convert the input AC power into the DC power.

8. The UPS system of claim 1, wherein in monitoring the input voltage level the controller is further configured to determine an RMS voltage of the input power.

9. A method for operating a UPS system, the method comprising:
receiving, at an input of the UPS system, input power having an input voltage level;
monitoring the input voltage level;
converting the input power into DC power having a DC voltage level;
providing the DC power to a DC bus;
converting the DC power into output AC power;
monitoring a level of the output AC power;
providing the output AC power to an output of the UPS system; and
adjusting the DC voltage level based on the input voltage level and the level of the output AC power,
wherein monitoring the input voltage level comprises determining whether the input voltage level is less than an input voltage threshold level, and
wherein adjusting the DC voltage level comprises, in response to determining that the input voltage is greater than the input voltage threshold level, regulating the DC voltage level to a maximum DC voltage level.

10. The method of claim 9, wherein monitoring the level of the output AC power comprises determining whether the output AC power level is less than an output power threshold level.

11. The method of claim 10, wherein adjusting the DC voltage level comprises, in response to determining that the input voltage level is less than the input voltage threshold level and the level of the output AC power is less than the output power threshold level, decreasing the DC voltage level.

12. The method of claim 11, wherein decreasing the DC voltage level comprises:
in response to determining that the level of the output AC power is less than the output power threshold level by a first amount, decreasing the DC voltage level to a first reduced level; and
in response to determining that the level of the output AC power is less than the output power threshold level by a second amount greater than the first amount, decreasing the DC voltage level to a second reduced level.

13. The method of claim 10, wherein adjusting the DC voltage level comprises, in response to determining that the level of the output AC power is greater than the output power threshold level, regulating the DC voltage level to a maximum DC voltage level.

14. An Uninterruptible Power Supply (UPS) system, the UPS system comprising:
- an input configured to receive input power having an input voltage level;
- an output configured to provide output AC power to a load;
- a converter coupled to the input and configured to convert the input power into DC power having a DC voltage level;
- a DC bus coupled to the converter and configured to receive the DC power;
- an inverter coupled to the DC bus and configured to convert the DC power from the DC bus into output AC power and provide the output AC power to the output; and
- means for increasing efficiency of the UPS system by decreasing the DC voltage level in response to a determination that the input voltage level is less than an input voltage threshold and that a level of the output AC power is less than an output power threshold level.

* * * * *